United States Patent
Hsu et al.

(10) Patent No.: US 10,228,750 B2
(45) Date of Patent: Mar. 12, 2019

(54) REDUCING THE POWER CONSUMPTION OF AN INFORMATION HANDLING SYSTEM CAPABLE OF HANDLING BOTH DYNAMIC AND STATIC DISPLAY APPLICATIONS

(71) Applicant: Dell Products, L.P., Round Rock, TX (US)

(72) Inventors: Isaac Hsu, Taiwan (TW); Adolfo S. Montero, Plfugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 96 days.

(21) Appl. No.: 15/339,867

(22) Filed: Oct. 31, 2016

(65) Prior Publication Data

US 2018/0120922 A1    May 3, 2018

(51) Int. Cl.
| | | |
|---|---|---|
| G06F 1/32 | (2006.01) | |
| G06F 1/3287 | (2019.01) | |
| G06F 1/3234 | (2019.01) | |

(52) U.S. Cl.
CPC .......... *G06F 1/3287* (2013.01); *G06F 1/3265* (2013.01)

(58) Field of Classification Search
CPC .................................................... G06F 1/3287
USPC ................................................. 713/323, 324
See application file for complete search history.

(56) References Cited

U.S. PATENT DOCUMENTS

| | | | | |
|---|---|---|---|---|
| 2010/0123727 | A1* | 5/2010 | Kwa et al. | G06T 1/00 345/522 |
| 2012/0233451 | A1* | 9/2012 | Liu et al. | G06F 9/00 713/2 |
| 2015/0248741 | A1* | 9/2015 | Iranli et al. | G06T 1/60 345/557 |
| 2015/0378748 | A1* | 12/2015 | Cheng et al. | G06F 9/44 713/2 |
| 2016/0116969 | A1* | 4/2016 | Biswas et al. | G06F 1/32 711/118 |
| 2016/0306664 | A1* | 10/2016 | Oliver | G06F 9/50 |

* cited by examiner

*Primary Examiner* — Jaweed A Abbaszadeh
*Assistant Examiner* — Sumil M Desai
(74) *Attorney, Agent, or Firm* — Fogarty LLP (57) ABSTRACT

Systems and methods for reducing the power consumption of an Information Handling System (IHS). In some embodiments, an IHS may be configured to: in response to a request to operate in static display mode: (a) render static content on a display, (b) allow the processor to enter standby by notifying an OS that the display is off while keeping the display on, and (c) maintain the display refreshed with the static content; while in static mode and in response to a command that requires updating the static content, wake up the processor and generate updated static content using the processor; and after generating the updated static content: render the updated static content on the display while the processor is awake, allow the processor to re-enter standby by notifying the OS that the display is off while keeping the display on, and maintain the display refreshed with the updated static content.

20 Claims, 4 Drawing Sheets

REDUCING THE POWER CONSUMPTION OF AN INFORMATION HANDLING SYSTEM CAPABLE OF HANDLING BOTH DYNAMIC AND STATIC DISPLAY APPLICATIONS

FIELD

This disclosure relates generally to Information Handling Systems (IHSs), and more specifically, to systems and methods for reducing the power consumption of an IHS capable of handling both dynamic and static display applications.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Most IHSs include (or are otherwise connected to) a display, screen, or monitor that allows a user to interact with the IHS. When implemented as a desktop computer, laptop, or smartphone, for example, many IHSs include a Liquid Crystal Display (LCD) that is capable of rendering complex graphics to bring dynamic content such as video, animations, etc. to the user. In other implementations, however, the IHS may take the form of an electronic book (e-book) reader or tablet having an "e-ink" display that, unlike a conventional LCD, is designed primarily for displaying static or quasi-static content (e.g., e-books).

Although conventional IHSs and LCDs are also generally capable of handling e-book applications and displaying e-books, the inventors hereof have recognized that dedicated or specialized e-book devices still consume less power than general-purpose IHSs, even when both are displaying the same content. To address these and other concerns, the inventors have developed systems and methods for reducing the power consumption of IHSs capable of handling both dynamic and static display applications.

SUMMARY

Embodiments of systems and methods for reducing the power consumption of an IHS capable of handling both dynamic and static display applications are described herein. In an illustrative, non-limiting embodiment, an Information Handling System (IHS) may include a processor and a memory coupled to the processor, the memory having program instructions stored thereon that, upon execution by the processor, cause the IHS to: in response to a request to operate in static display mode: (a) render static content on a display, (b) allow the processor to enter standby by notifying an Operating System (OS) that the display is off while keeping the display on, and (c) maintain the display refreshed with the static content; while in static mode and in response to a command that requires updating the static content, wake up the processor and generate updated static content using the processor; and after generating the updated static content: (a) render the updated static content on the display while the processor is awake, (b) allow the processor to re-enter standby by notifying the OS that the display is off while keeping the display on, and (c) maintain the display refreshed with the updated static content.

In some cases, the static content may be an electronic book (e-book). The request to operate in static mode may be received via a software application configured to operate as an e-book reader. The display may be a backlit Liquid Crystal Display (LCD) screen. Additionally or alternatively, the display may be a dual-mode display. In some cases, the standby includes an S0 low-power idle mode.

In some embodiments, the operation of notifying the OS that the display is off while the display is on is performed by an Embedded Controller (EC) coupled to the processor. Maintaining the display refreshed with the static content may include the EC requesting that a Graphical Processing Unit (GPU) configured to control the display enter a low-power mode.

In connection with the rendering of updated static content on the display, the program instructions, upon execution, may further cause the IHS to display an animation or moving image after the processor is awoken and prior to the processor re-entering standby. Prior to allowing the processor to re-enter standby, the program instructions, upon execution, may cause the IHS to wait a predetermined amount of time in the absence of user input.

In another illustrative, non-limiting embodiment, a method may implement one or more of the aforementioned operations. In yet another illustrative, non-limiting embodiment, a memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods described herein may be used to reduce the power consumption of an IHS capable of handling both dynamic and static display applications. Some of the techniques described herein may be implemented, for example, via a software application or component designed to display static content (e.g., an e-book, a still picture, etc.) when executed by an otherwise general-purpose IHS that has or is otherwise coupled to a general-purpose active or dynamic display.

The term "dynamic content" refers to graphical or visual information that changes or is subject to changing quickly, and a dynamic or active screen or display is one capable of presenting video, animations, or other rapidly moving images with an acceptable latency or response time for a given application. In contrast, the term "static content" or "quasi-static content" refers to graphical information that changes much more slowly than dynamic content.

A truly "static rendering" is one that does not change at all (absent intervention, that is). Such a static rendering may change, however, when a user turns an e-book page, navigates a pull-down menu of a Graphical User Interface (GUI), uses simple gestures to interface with the IHS (e.g., pinch to zoom, etc.), etc. These changes generally involve some processor intervention, and therefore activities that take place in the time interval between two truly static renderings are referred to as "dynamic," resulting in "dynamic renderings," such as animations or the like. During operation of an IHS there may be situations where processing intervention is needed to update the screen content, but there may be other situations where absolutely no processor intervention is needed because the display is stagnant. (In alternative embodiments, a semi-static display may be used that employ a less power hungry processor.)

Accordingly static or passive screen is generally not capable of displaying video or animations without an unacceptable latency or response time, but rather it shows other generally immovable content that does not change, or at least not as often or quickly as dynamic content.

A dynamic or active display, on the other hand, is capable of displaying constantly changing images in rapid succession (e.g., 60 or 120 frames per second). Many static display technologies are referred to as "bistable," which means that the image on an e-ink screen is retained even when all power sources are removed, and the display consumes power only when the image is changing. By contrast, with a traditional LCD, the display needs to be refreshed around at least about 30 times per second, regardless of the whether anything new is being displayed.

Also, a dynamic or active display (e.g., a conventional LCD screen) typically includes a backlight. In an LCD or "emissive display," light from a backlight is projected through the display. In contrast, a static or passive display (e.g., e-ink) does not have, use, and/or rely upon any backlight to display information. Rather, ambient light from the environment is reflected from the surface of the display.

In various implementations, systems and methods described herein may provide an otherwise general-purpose IHS with a hybrid operation mode specifically designed for static display applications, such as e-book processing. For example, an IHS may be placed in a standby mode within the OS stack context, yet its LCD panel may be made to remain powered on (unbeknownst to the OS) using its self-refresh capability to keep static display information on the screen.

An embedded controller (EC) within the IHS takes over user input activities to allow waking from standby to enable the OS stack/application to process a visual change (e.g., turn page, scroll, zoom). Once the display change/update processing is completed, the IHS quickly re-enters standby and the EC keeps the display powered on (again, unbeknownst to the OS) to allow the user to continue reading the content. This may be repeated until the user exits the hybrid operation mode.

In other implementations, a single dual-mode screen may be provided to an otherwise conventional general-purpose IHS, such that the dual-mode screen natively supports both dynamic and static operations.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a CPU or hardware or software control logic, Read-Only Memory (ROM), and/or other types of nonvolatile memory.

Additional components of an IHS may include one or more disk drives, one or more network ports for communicating with external devices as well as various input/output (I/O) devices, such as a keyboard, a mouse, a touchscreen, and/or a video display. An IHS may also include one or more buses operable to transmit communications between the various hardware components. An example of an IHS is described in more detail below.

Figure 1:
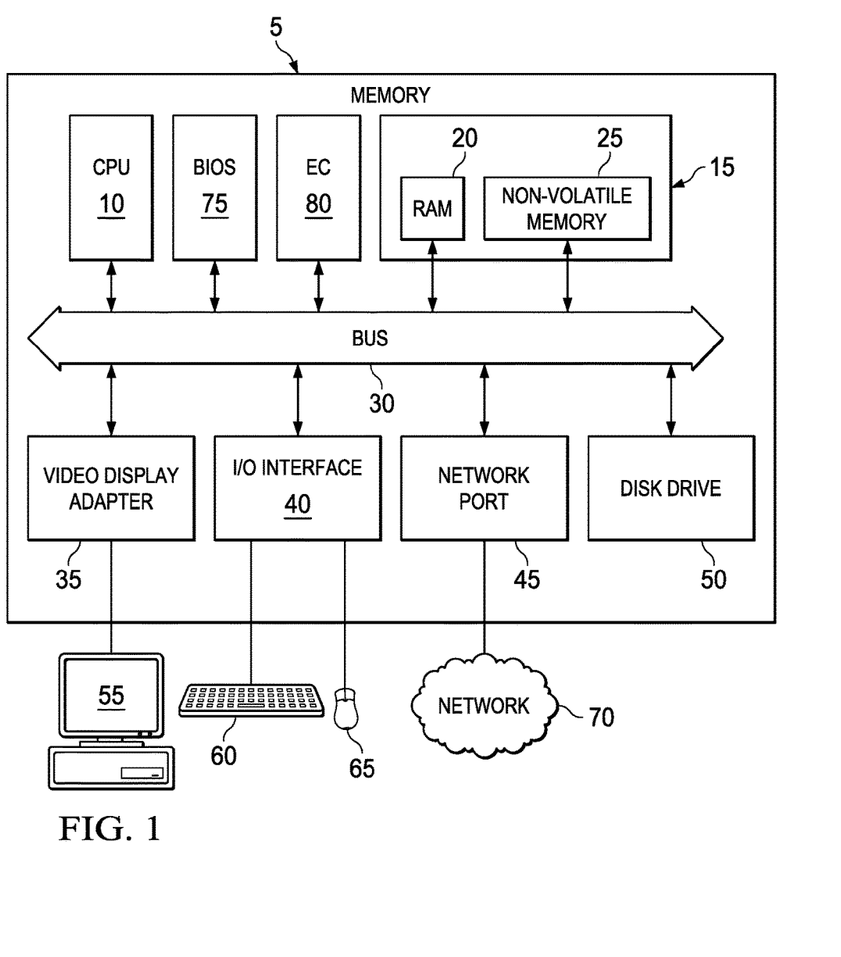
FIG. 1 is a block diagram of an example of an Information Handling System (IHS) configured to implement systems and methods described in various embodiments.

FIG. 1 shows an example of IHS 5 configured to implement systems and methods described herein. It should be appreciated that although certain embodiments described herein may be discussed in the context of a desktop or server computer, other embodiments may be utilized with virtually any type of IHS. In this embodiment, IHS 5 is configured to reduce its power consumption when handling dynamic and static display applications, as explained in more detail below.

As shown, IHS 5 includes main processor or CPU 10. Main processor 10 may be a processor, a microprocessor, minicomputer, or any other suitable processing device, including combinations and/or a plurality thereof, capable of or configured to execute program instructions. For example, execution of an algorithm or software configured to implement techniques described herein may occur, at least in part, within main processor 10.

Main processor 10 may be in data communication over a local interface bus 30 with a variety of components. Examples of such components include, but are not limited to: memory 15, Input/Output (I/O) interface 40, network port or adaptor 45, disk drive 50, Basic Input/Output System (BIOS) 75, Embedded Controller (EC) 80, and video display adapter 35.

Memory 15, as illustrated, may include volatile memory 20 (e.g., random access memory or "RAM") and/or non-volatile memory 25. The IHS's Operating System and application programs may be loaded into RAM 20 for execution. As used herein, the term "OS" generally refers to a set of programs that control operations of the IHS and allocation of resources. An application program runs on top of the OS and uses computer resources made available through the OS to perform application specific tasks desired by a user.

Non-volatile memory 25 may include, but is not limited to, flash memory, non-volatile random access memory (NVRAM), or electrically erasable programmable read-only memory (EEPROM). In some cases, non-volatile memory 25 may contain firmware or the like, which may include persistent programming and/or executable instructions for managing certain aspects, devices, and/or components of IHS 5.

Input/Output (I/O) interface 40 is responsible for providing a number of I/O ports, including a keyboard port, a mouse port, a serial interface, a parallel port, etc. to IHS 5. As such, I/O interface 40 may be coupled to keyboard 60, mouse 65, and/or other I/O devices.

Network port or adaptor 45 enables communications over network 70, such as a local area network (LAN) or a wide area network (WAN), such as the Internet.

Disk drive 50 is a storage device where data is recorded persistently using various electronic, magnetic, optical, and/or mechanical techniques. Examples of disk drive 50 include a hard disk drive (HDD), a solid-state drive (SSD), a hybrid drive, an optical disc drive, etc.

Basic Input/Output System (BIOS) 75 is a type of firmware used during the booting process (reset or startup) of IHS 5 that contains the first software that is executed when IHS 5 is powered on. BIOS 75 includes BIOS program code containing the basic routines that help to start up IHS 5 and to transfer information between elements within IHS 5. In some implementations, BIOS 75 may include firmware compatible with the EFI Specification and Framework. In operation, BIOS 75 is configured to initialize and test the IHS's hardware components, and also to load a boot loader or an Operating System (OS) from a memory. In modern systems, BIOS 75 includes flash memory so it can be rewritten without having to physically remove the chip from IHS 5.

Embedded Controller (EC) 80 enables management of various components of IHS 5. For example, EC 80 may interface with a keyboard to accept end user inputs (e.g., via I/O interface 40), and it may provide many different system management functions, such as power management, thermal management, etc. For example, in various embodiments, EC 80 may be configured to issue a control signal to disable video display adapter 35 and/or display 55. Additionally or alternatively, EC 80 may be configured to cause video display adapter 35 and/or display 55 to enter a refresh-only or low-power mode.

It should be noted that EC could have multiple paths into video display controls. In some cases, such a path may be provided via GPIOs to directly toggle signals going to the display screen (hybrid/LCD/e-ink). Another embodiment may include a EC GPIO to GPU (Graphics Processing Unit) path in cases where the GPU is controlling the screen. Yet another embodiment could be digital messaging via OS paths to the video driver Video display adapter 35 includes a video card and/or video hardware integrated into the IHS's motherboard or CPU 10. Motherboard-based implementations are sometimes called "on-board video," while CPU-based implementations are known as Accelerated Processing Units (APUs). Many modern IHSs have motherboards with integrated graphics that also allow the disabling of the integrated graphics chip in BIOS 75, and have a PCI, or PCI Express (PCI-E) slot for adding a higher-performance graphics card in place of the integrated graphics. As such, video display adapter 35 may be used to feed video and images to display 55.

In some cases, display 55 includes a Liquid Crystal Display (LCD). The LCD display may include, for example a backlight and/or may be capable of refresh rates of at least 30 frames per second. In other cases, display may be a hybrid display that can be used as either a conventional LCD-type display (with a backlight turned on) or an e-ink display that can often maintain a static image on display for long periods of time (e.g., minutes, hours, days, etc.) in the absence of refresh and/or without any backlight turned on.

It should be appreciated that, in other embodiments, the IHS may comprise any device that executes software, including embedded systems such as, for example, cable-top boxes, phones, media devices, game consoles, telephony equipment, traffic lights, automotive vehicles, avionics, factory controllers, etc. Each of these devices may have its own power and display requirements. It is also contemplated that an IHS may not include all of the components shown in FIG. 1, may include other components that are not explicitly shown, or may utilize a different architecture.

The overall power consumption of IHS 5 can be categorized into "power states." For example, the Advanced Configuration and Power Interface (ACPI) specification provides a standard for device configuration and power management that defines a total of six different power states ranging from "S0," when the IHS is completely powered on and fully operational to "S5," when the IHS 200 is completely powered off. Intermediate states "S1," "S2," "S3," and "S4" are referred to as wake/sleep/standby states. During these states, an IHS may appear to a human user to be off, but may retain enough of its hardware context (e.g., registers, memory caches, RAM, etc.) to return to the working state without rebooting.

Particularly, in the S1 state, the IHS consumes less power than in the S0 state; yet all hardware and processor context is maintained. In the S2 state, the IHS consumes less power than S1 state. The IHS's CPU loses power and processor context, and contents of its cache may be lost. In the S3 state, the IHS consumes less power than in the S2 state. The CPU's context, cache contents, and chipset's context may be lost; but the system memory is retained. In the S4 state, also known as "hibernation," the IHS consumes the least amount of power compared to all other sleep states. The IHS is almost at an off state, expect for a trickle power. Context data is written to a hard drive, and there is no context retained. Note that in power state S4, an IHS can restart from context data stored on a hard disk, but in S5 the IHS requires a reboot.

With respect to transitions between states, it is noted that an IHS is "waking up" when transitioning from the off state S5 or any state S1-S4 to state S0. Conversely, the IHS is said to be going to "sleep" when transitioning from the on state S0 to the off state S5 or any state S1-S4. Typically, an IHS may not enter one sleep state directly from another; rather it enters the on state S0 before entering any other sleep state. It should be noted, however, that the foregoing power states are discussed for purposes of illustration only, and that different IHSs may have different wake/sleep/standby states.

For example, the concept of "Modern Standby" or "Connected Standby" was recently introduced. In Modern Standby, the IHS uses an S0 low-power idle model that provides an instant on/off experience that users expect to have with smartphones. Modern Standby uses multiple hardware and software power modes, all of which occur with the screen turned off. Modern standby starts when the user presses the power button or otherwise causes the system to enter sleep. In response, the IHS immediately turns off its display and begins preparations for entering the lowest idle power mode.

When the user presses the power button or otherwise causes the system to resume from standby, the display is immediately turned on and networking devices are restored to their normal, active operating modes. The time from the power button press to the turning on of the display can be less than 500 milliseconds. After the display is turned on, the device returns to normal operating mode, software applications resume and the IHS returns to its normal, screen-on active behavior.

Figure 2:
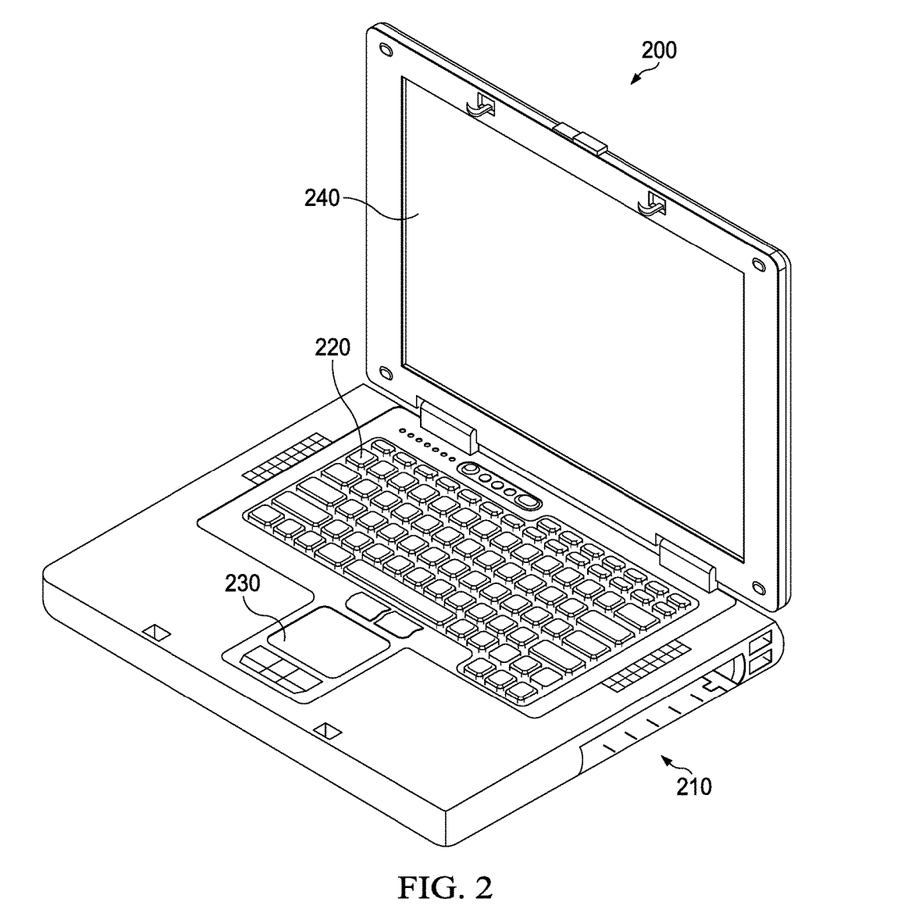
FIG. 2 is a diagram of an example of a portable IHS having a screen, display, or monitor configured to implement systems and methods described in various embodiments.

FIG. 2 provides an illustrative implementation of portable IHS 200 having a screen, display, or monitor configured to implement systems and methods described in various embodiments. In this example, portable IHS 200 may provide base housing 210 and display housing 220. Display housing 220 may include a flat panel display, such as a liquid crystal display (LCD), which may be coupled to components in base housing 210. Base housing 210 may provide several of the components present in IHS 5 of FIG. 1.

By way of example and not limitation, base housing 210 may include a CPU, memory, a video display adapter, I/O interfaces, a network port, a disk drive, a BIOS, an EC, etc. Portable IHS 200 may also provide several buttons 230, such as a power button, a special IHS mode button, display adjustment buttons, etc.

Additionally, portable IHS 200 may include an AC adapter and a battery pack (not shown). The AC adapter may plug into an alternating current (AC) power outlet to power the components of portable IHS 200 and/or to charge the battery pack. When an AC adapter is not coupled to portable IHS 200, components of portable IHS 200 may be powered by the battery pack. The battery life or the amount of temporary power a battery pack may provide may depend on the rate of power consumption for the portable IHS, which in turn may depend upon the amount of data processing being performed by the video display adapter or GPU.

Figure 3:
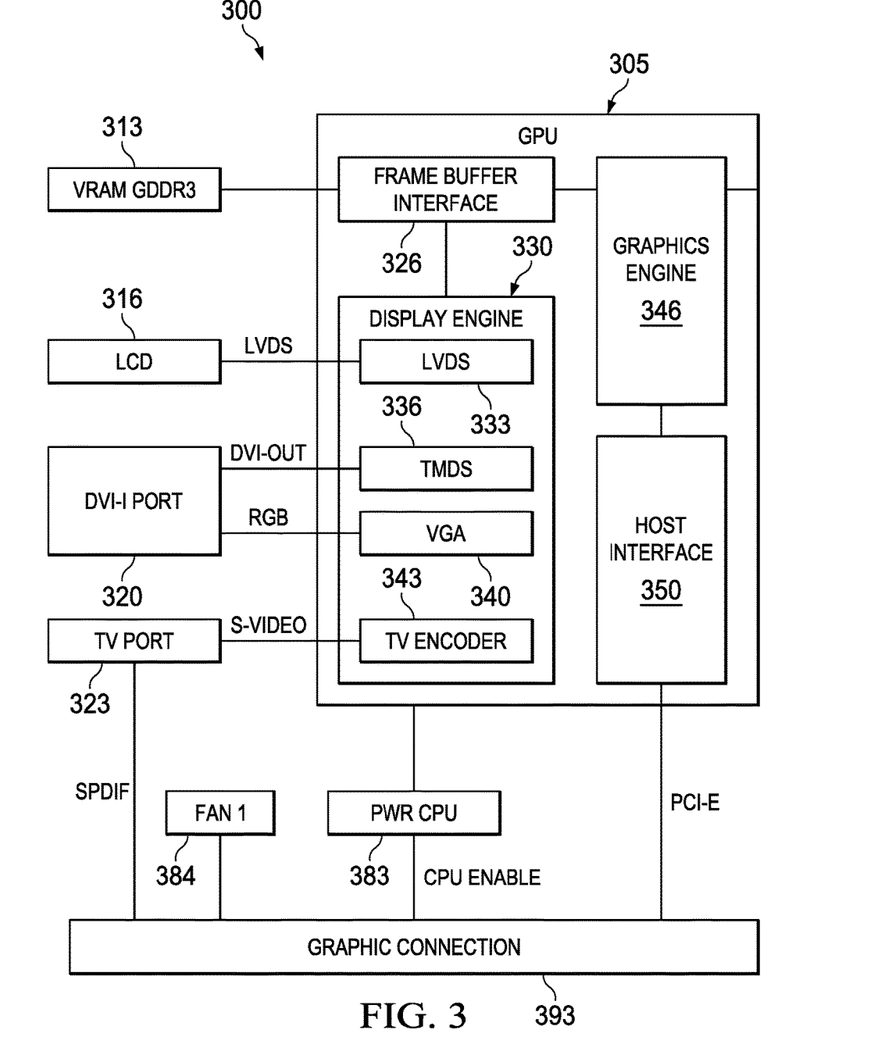
FIG. 3 is a diagram of an example of a graphics system configured to implement systems and methods described in various embodiments.

FIG. 3 is a diagram of an example of video display adapter 300 configured to implement systems and methods described herein. In various embodiments, adapter 300 may be used as adapter 35 of FIG. 1. As shown, GPU 305 may be coupled to graphic connector 393. Graphic connector 393 may provide an interface to a motherboard that allows GPU 305 and to communicate with other components of an IHS, such as a processor, memory, power source, peripherals, I/O devices, disk drives, and various components of an IHS.

For example, graphic connector 393 may provide a peripheral component interconnect express (PCI-E or PCIe) interface or any other suitable interface for a GPU. In a multi-core graphics solution, a bridge (not shown) may be utilized to couple GPU 305 and another GPU to graphic connector 393.

Graphic connector 393 may also be coupled to power regulator 383, which may allow GPU 305 to be enabled or disabled. Fan 384 may also be coupled to graphics connector 393 to provide cooling to GPU 305. A thermal sensor (not shown) may measure the temperature of GPU 305, and it may be coupled to a system management bus (SMBus) to provide temperature data the OS or the like. An IHS may utilize such a thermal sensor, for example, to detect the temperature of GPU 305 and control fan 384 to regulate the temperature of GPU 305 accordingly.

Host interface 350 may provide an interface between graphics engine 346 and connector 393. Graphics engine 346 may be coupled to a video random access memory (VRAM) 313 through a frame buffer interface 326. VRAM 313 may comply with a version of graphics double data rate (GDDR), such as GDDR2, GDDR3, GDDR4, or GDDR5. Utilizing VRAM 313, graphics engine 346 may perform video and graphics processing for an IHS.

Video and graphics processing may involve performing computations related to video and graphics data, such as rendering, texture mapping, geometric calculations, compression, motion compensation, and/or various other types of processing performed on video and graphics data. Frame buffer interface 326 may also couple graphics engine 346 to display engine 330, which may convert the processed data into different formats for different types of outputs. For instance, display engine 330 may provide a low voltage differential signaling (LVDS) 333, transition minimized differential signaling (TMDS) 336, video graphics array (VGA) 340, and/or TV encoder 343 outputs.

Each of the different outputs may provide a signal in a different protocol and may utilize specific types of connectors and cables (e.g., LVDS, DVI-out, RGB, and S-Video). For instance, GPU 305 may output a signal to a liquid crystal display (LCD) 316 utilizing a twisted-pair copper cable and/or it may output a signal to a digital visual interface-integrated (DVI-I) port 320 or to a TV port 323 which may also receive a digital audio signal (SPDIF) from the graphic connector 393.

Figure 4:
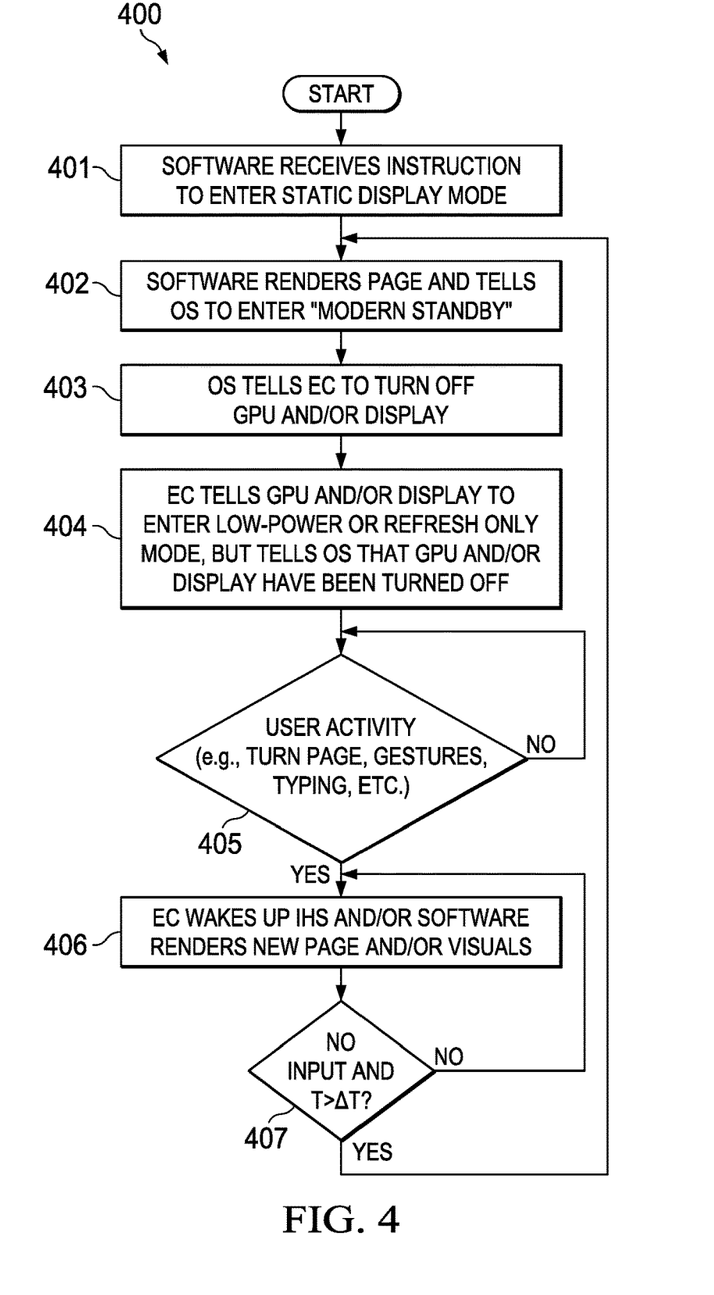
FIG. 4 is a flowchart of an example of a method for reducing the power consumption of an IHS capable of handling both dynamic and static display applications in various embodiments.

FIG. 4 is a flowchart of an example of method 400 for reducing the power consumption of an IHS capable of handling both dynamic and static display applications. In various embodiments, method 400 may be performed through cooperation of certain components within IHS 5, such as, for example, video display adapter 35, display 55, EC 80, and/or OS or software applications executed by CPU 10.

As illustrated, at block 401, an OS or application may receive instructions from a user to enter static display mode, also known as "e-book" mode. For example, the software application may be a document reader (e.g., a PDF reader, e-book reader, etc.) and the instruction may be received via a mouse click over a button rendered on graphical user interface displayed to the user.

At block 402, the software or OS causes a static page to be rendered on a display (e.g., display 55), for example, in full-screen mode. The static page may be, for instance, a page of an electronic book (e-book). At this point, the OS may request or be requested to enter Modern Standby or a low-power mode, under which the main processor is in an S0 low-power idle mode, for example. Accordingly, at block 403, the OS signals EC 80 to turn off the GPU and/or display, which would ordinarily be a requirement of Modern Standby specifications.

At block 404, rather than signaling the GPU and/or display to turn itself off completely, EC 80 tells the GPU and/or display to enter a low-power mode or refresh-only mode, where little or no graphics processing is required of the GPU. Nonetheless, EC 80 "spoofs" the OS with a "ready to enter Modern Standby" signal and indicates that the GPU and/or display have been turned off, and therefore the IHS is ready for Modern Standby.

The main processor is now in S0 low-power idle mode, but because the GPU and/or display are in refresh-only mode, the same image originally rendered as a static page at block 402 remains unchanged and refreshed on display. In some cases, a backlight may be turned off while the system is in Modern Standby or, in the case of a hybrid or dual-mode display, an e-ink display mode may be selected.

Block 405 determines whether to leave Modern Standby and re-enter active mode. For example, in some instances EC 80 may detect a user command (e.g., a keyboard entry or mouse click) that requires updating the original page or static content. If so, at block 406 EC 80 wakes up the main processor and/or GPU and updates the static content using the main processor and/or GPU.

Still at block 406, after generating the updated static content method 400 may render the updated static content on the display while the main processor is awake. In some cases, in connection with the rendering of updated static content on the display, block 406 may display an animation or moving image after the main processor is awoken and prior to the main processor re-entering Modern Standby.

At block 407, if additional instructions or inputs are detected that require a dynamic change in the current page, display, or rendering (e.g., a video, animation, page turns, mouse trace, menu selections, zoom, underlining, highlighting, dictionary lookup, etc.), control remains with block 406 and the system remains in active or dynamic mode. If, however, block 407 determines that no user input has been received, for example, for a selected period of time Δt (e.g., 1 minute), then control returns to block 402 where the system re-enters Modern Standby. EC 80 signals to the OS that a GPU or display has been turned off when instead it is put in low-power or refresh-only mode. Hence, the main processor can enter the S0 low-power idle mode while a static image remains presented on the display.

In some embodiments, the user may elect to end method 400 at any time. In those cases, the OS or other application may be configured to default the IHS to either active or static display mode, depending upon a previous user preference or selection.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising: a processor; and
a memory coupled to the processor, the memory having program instructions stored thereon that, upon execution by the IHS, cause the IHS to:
in response to a request to operate in static display mode: (a) render static content on a display, (b) allow the processor to enter a standby mode once the static content has been rendered on the display by notifying an Operating System (OS) that the display is off while keeping the display on, and (c) maintain the display refreshed with the static content while the processor remains in standby mode;
while in the static display mode and in response to a command that requires modifying the static content rendered on the display, wake up the processor and generate updated static content using the processor; and
after generating the updated static content: (a) render the updated static content on the display while the processor is awake, (b) allow the processor to re-enter standby mode once the updated static content has been rendered on the display by notifying the OS that the display is off while keeping the display on, and (c) maintain the display refreshed with the updated static content while the processor remains in standby mode.

2. The IHS of claim 1, wherein the static content is a portion of an electronic book (e-book).

3. The IHS of claim 1, wherein the request to operate in static mode is received via a software application configured to operate as an e-book reader.

4. The IHS of claim 1, wherein the display is a backlit Liquid Crystal Display (LCD) screen.

5. The IHS of claim 1, wherein the display is a dual-mode display.

6. The IHS of claim 1, wherein the standby mode comprises an S0 low-power idle mode.

7. The IHS of claim 1, wherein the operation of notifying the OS that the display is off while the display is on is performed by an Embedded Controller (EC).

8. The IHS of claim 7, wherein the processor is a Graphical Processing Unit (GPU), and wherein maintaining the display refreshed with the static content includes the EC requesting that the GPU enter a low-power mode capable of refreshing the display with the static content.

9. The IHS of claim 1, wherein in connection with the rendering of updated static content on the display, the program instructions, upon execution, further cause the IHS to display an animation or moving image after the processor is awoken and prior to the processor re-entering standby.

10. The IHS of claim 1, wherein prior to allowing the processor to re-enter standby, the program instructions, upon execution, further cause the IHS to wait a predetermined amount of time in the absence of user input.

11. A memory device having program instructions stored thereon that, upon execution by an Information Handling System (IHS), cause the IHS to:
in response to a request to operate in e-book mode: (a) render e-book content on a Liquid Crystal Display (LCD), (b) allow a processor to enter a standby mode once the e-book content has been rendered on the display by notifying an Operating System (OS) that the LCD is off while keeping the LCD on, and (c) maintain the LCD refreshed with the e-book content while the processer remains in standby mode;
while in e-book mode and in response to a command that requires modifying the e-book content rendered on the LCD, wake up the processor and generate updated e-book content using the processor; and
after generating the updated e-book content: (a) render the updated e-book content on the LCD while the processor is awake, (b) allow the processor to re-enter standby mode once the updated e-book content has been rendered on the display by notifying the OS that the LCD is off while keeping the LCD on, and (c) maintain the LCD refreshed with the updated e-book content while the processor remains in standby mode.

12. The memory device of claim 11, wherein the standby mode is an S0 low-power idle mode.

13. The memory device of claim 11, wherein the processor is a Graphical Processing Unit (GPU), and wherein maintaining the LCD refreshed with the e-book content includes requesting that the GPU enter a refresh-only mode capable of refreshing the LCD with the e-book content.

14. The memory device of claim 11, wherein in connection with the rendering of updated e-book content on the LCD, the program instructions, upon execution, further cause the IHS to display an animation or moving image after the processor is awoken and prior to the processor re-entering the standby mode.

15. The memory device of claim 11, wherein prior to allowing the processor to re-enter the standby mode, the program instructions, upon execution, further cause the IHS to wait a predetermined amount of time in the absence of user input.

16. In an Information Handling System (IHS), a method comprising:
rendering static content on a screen;
allowing a processor to enter a low-power mode once the static content has been rendered on the display by notifying an Operating System (OS) that the screen is off while keeping the screen on;
maintaining the screen refreshed with the static content while the processor remains in low-power mode;
receiving a command that requires modifying the static content;
waking up the processor from the low-power mode;
generating modified static content using the processor;
rendering the modified static content on the screen;
allowing the processor to re-enter the low-power mode once the modified static content has been rendered on the screen by notifying the OS that the screen is off while keeping the screen on; and
maintaining the screen refreshed with the modified static content while the processor remains in low-power mode.

17. The method of claim 16, wherein the low-power mode is a power mode in which the OS operates as if the screen be turned off.

18. The method of claim 16, wherein the processor is a Graphical Processing Unit (GPU), and wherein maintaining the screen refreshed with the static content includes requesting that the GPU enter a refresh-only mode capable of refreshing the screen with the static content.

19. The method of claim 16, further comprising, in connection with the rendering of updated content on the screen, displaying an animation or moving image after the processor is awoken and prior to the processor re-entering the low-power mode.

20. The method of claim 16, further comprising, prior to allowing the processor to re-enter the low-power mode, waiting a predetermined amount of time in the absence of user input.

* * * * *